3,217,611
SPRING POWERED EMERGENCY AND PARKING BRAKE ACTUATOR WITH MANUALLY OPERABLE LOADING MEANS
Francis Leighton, Encino, Calif., assignor to Crane Co., doing business as Hydro-Aire Company, Burbank, Calif., a corporation of Illinois
Continuation of application Ser. No. 189,177, Apr. 20, 1962. This application Feb. 14, 1964, Ser. No. 345,013
1 Claim. (Cl. 92—64)

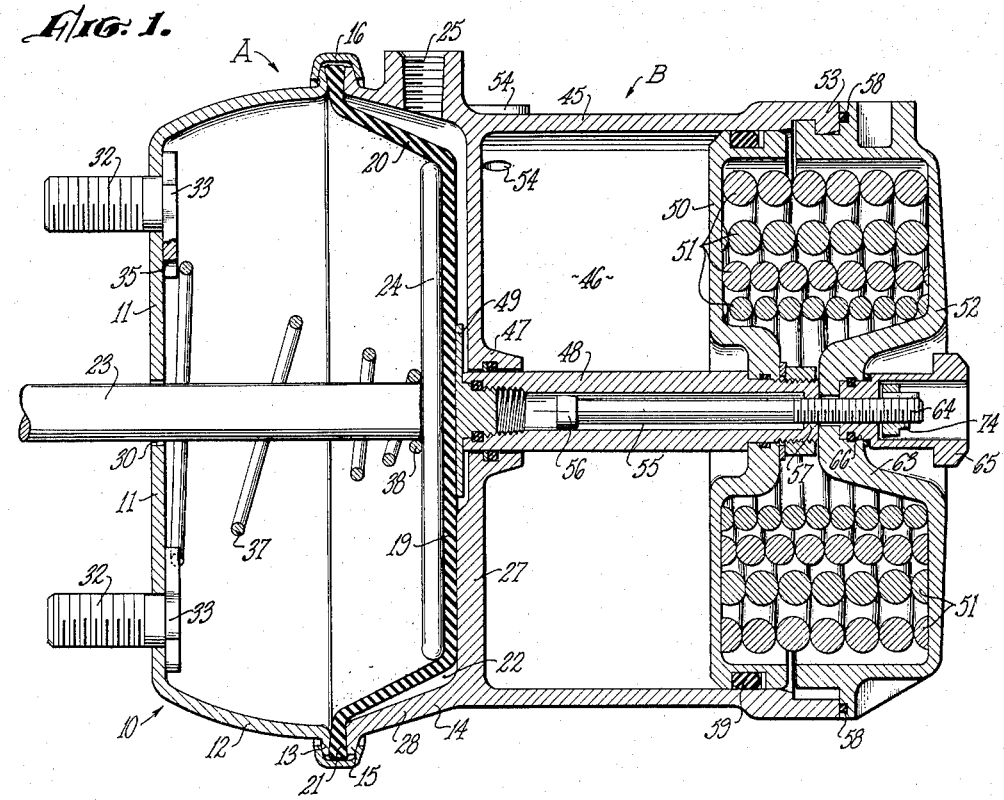

This application is a continuation of my pending application for Air Brake Actuator of Minimum Axial Depth, Serial No. 189,177, filed April 20, 1962, and now abandoned.

This invention relates to air brake actuators of the type disclosed in the aforesaid application, and, in particular, to a spring-powered emergency-parking unit of such an actuator, having manually operable means for retracting the spring-propelled piston and compressing the propelling spring means thereof so as to unload the actuator diaphragm for releasing brakes that have been set by spring action following failure or release of air pressure normally utilized for retracting the piston.

The general object of the invention is to provide manual unloading means in a spring powered brake actuator of the type wherein the spring power is transmitted from the piston through a tubular stem to the diaphragm of a service brake actuator and wherein the forward, brake actuating movement of the piston is limited by a tie rod supported by the rear end cap of the emergency-parking brake actuator unit, extending into the tubular piston stem, and having stop means for arresting the forward movement of the piston at a position short of contact with the forward end wall of such unit.

A further object is to provide improvements in this type of spring-powered actuator unit.

Other objects and advantages will become apparent in the ensuing specification and appended drawing in which:

FIG. 1 is an axial sectional view of the invention as embodied in a combined service brake and emergency-parking brake actuator;

FIG. 2 is a fragmentary, detailed axial sectional view on an enlarged scale, with half of the piston stem and associated parts shown in elevation;

FIG. 3 is a transverse sectional view taken on the line 3—3 of FIG. 4;

FIG. 4 is a transverse sectional view taken on the line 4—4 of FIG. 2; and

FIG. 5 is a transverse sectional view taken on the line 5—5 of FIG. 2.

Referring now to the drawings in detail, I have shown in FIG. 1 thereof, as an example of one form in which the invention may be embodied, a combined service brake and emergency-parking brake apparatus comprising, in general, an airbrake actuator unit A in combination with a spring powered emergency-parking actuator unit B in a combined unit assembly.

DETAILED DESCRIPTION

Actuator unit A comprises (FIG. 1) a diaphragm housing section 10 embodying a front end wall 11, a rim wall 12 and a rim flange 13; a cover section 14 embodying a rim flange 15 coupled to the flange 13 by a band clamp 16; a shaped diaphragm 18 comprising a flat central web 19, a frusto-conical peripheral wall portion 20 and a peripheral bead 21 of wedge-section clamped between the housing flanges 13 and 15 and functioning as a gasket to pneumatically seal the diaphragm to the rear end cap 14 so as to define therewith an air chamber 22 in which air under pressure may act against the diaphragm; a brake operating rod 23 having a head 24 in the form of a flat circular disc of a diameter corresponding generally to that of the flat central portion 19 of the diaphragm; and an air inlet fitting 25 in cover 14, to which a compressed air line is attached in the installation of the unit in a vehicle, for delivering air under pressure into the chamber 22.

Diaphragm housing section 10 has, in its flat end wall, a central aperture 30. A pair of threaded mounting studs 32 are extended through apertures disposed in diametrically opposed, equally spaced relation to the central aperture 30, and at their inner ends have flat heads 33 which may be welded to the inner face of end wall member 11. The heads 33 have respective concave arcuate inward margins 35, between which the larger end turn of a spiral, conical spring 37 is retained, while an eye 38 on the other end of the spring is engaged against the brake rod head 24.

Emergency-parking brake unit B embodies a cylinder 45 which, as shown in FIG. 1, may be integral with cover 14 or alternatively may be fabricated as a separate unit and attached, as by welding, to the cover 14. The cover 14 comprises the rim portion 28 having its flange 15 coupled into band clamp 16, and includes a bulkhead 27 separating air brake chamber 22 from a piston-retractor air chamber 46 in unit B. Rim 28 has the peripheral air inlet 25 for chamber 22. Bulkhead 27 has a central packing boss 47, for passage of a tubular piston stem 48 having on its forward end a pressure pad 49 for transmitting auxiliary braking pressure through the diaphragm 18 and thence to the brake rod 23. There is provided within cylinder 45, a piston 50 attached to the rear end of tubular stem 48, a plurality of actuator springs 51 acting against the rear side of piston 50, and a rear end cap 52, coupled by a bayonet coupling 53 to the rear end of cylinder 45, providing a bearing support for the rear ends of springs 51. A second air inlet 54, in cylinder 45, directs air under pressure into the piston retractor chamber 46, for normally retracting the piston and compressing the springs 51. A tie rod 55 is telescoped in tubular piston stem 48 and has at its forward end a head 56 for engagement against an annular shoulder on the head (rear end) 57 of piston stem 48, for limiting the forward movement of piston 50 at a position short of engagement with bulkhead 27 so as to prevent the spring load from being applied between rear end cap 52 and cylinder 45 across the coupling 53. An O-ring 58, retained in an annular groove in the rim of cap 52, hermetically seals cap 52 to cylinder 45. An O-ring 59, retained in a groove in the rim of piston 50 and engaged against the inner wall of cylinder 45, hermetically seals the piston in the cylinder.

In the center of rear end cap 52 is an inwardly recessed boss 63 which has a central aperture in its head (inner end). The rear portion of tie rod 55 is externally threaded, at 64, for a very substantial portion of its length extending forwardly from its rear end. The threaded rear end portion 64 extends freely through the aperture in recessed boss 63. A manual retractor nut 65 (FIG. 2) has a cylindrical shank journalled in a cylindrical counterbore 66 in the head of boss 63, the inner end of the shank having end bearing engagement against the flat annular shoulder defining the bottom of counterbore 66. Nut 65 is yieldingly retained against axially outward displacement from counterbore 66 by an O-ring 67 which is engaged in mating annular grooves in the boss 63 and in the nut shank respectively.

Nut 65 is of elongated form so as to project outwardly from the recess of boss 63, and embodies a tubular skirt portion 68 and an annular knob 69 on the outer end thereof, these parts having a cylindrical counterbore 70 extending inwardly to a flat annular shoulder 71 forming the bottom thereof. A flat, radial, annular external shoulder 72 provides an offset between the diameter of the shank portion of nut 65 and its sleeve 68, and has end bearing engagement against a bearing ring 73 (e.g. bronze) of rectangular cross-section which seats against the bottom of the recess in boss 63.

A retainer nut 74 is threaded onto the end 64 of stem 55, in a position to limit the forward movement of stem 55 at a forward limit position wherein head 56 will engage stop shoulder of piston stem head 57 to prevent further forward movement of the piston 50 at a position short of contact with the bulkhead 27.

In one side of tie rod 55 is a flat face 75 which engages a mating flat face 76 in a D-shaped aperture 77 (FIG. 4) in the shouldered head 57 of stem 48. This prevents rotation of tie rod 55 with reference to piston stem 48 while it is freely slidable longitudinally therein. A key 76 (FIG. 5) engaged in a keyway within nut 74 and seated against the flat face 75 of tie rod 55, locks the retainer nut 74 in its selected position of adjustment on the threaded end 64 of the tie rod.

The rear end of stem 48 is secured in piston 50 by means of a reduced neck portion 80 thereof, threaded in a bore in the center of the piston, positioned by means of an annular shoulder 81 joining the base of neck portion 80 to the body of stem 48, shoulder 81 being seated against the forward face of piston 50, and secured in that position by a nut 82. Nut 82 is coupled to a threaded rear end portion of neck 80 and clamps a washer 83 against the rear face of piston 50 in the central portion thereof, which is dished rearwardly as shown in FIG. 1. The fully retracted position of the piston will be determined by engagement of the rear end of piston stem 48 (or nut 82) against the forward end of boss 63 of rear end cap 52. An O-ring gasket 84 is retained in an annular groove in piston 50 around neck 80 of the piston stem, under compression between the bottom of said groove and the wall of the neck, thus hermetically sealing the piston to the stem 48.

The annular groove 85 of boss 63, in which snap ring 67 is coupled, is relatively shallow, having a depth only about half the radius of the cross section of snap ring 67, whereas the groove in the shank of nut 65, in which a major portion of the cross section of the ring is received, is relatively deep. The assembly of nut 65 and tie rod 55 may be released from the retaining engagement of groove 85 by applying a strong axial pull against the head 69 of nut 65 while holding the end cap 52, the rounded surface of ring 67 yielding inwardly against the edge of groove 85 sufficiently to be released from the groove.

Stem 48 is hermetically sealed in boss 47 by an O-ring gasket 87 retained in an annular groove 88 in boss 47, between one side of the groove and a washer 89 therein, and engaged under compression between the bottom of the groove 88 and the outer wall of stem 48.

Pressure pad 49 is a thin flat circular disc, having an integral cylindrical shank 91 fitted within a cylindrical socket 92 in the end of stem 48, coupled thereto by a reduced threaded end 93 which is threaded into a threaded bore 94 in stem 48, and sealed thereto by an O-ring gasket 95 which is contained in registering annular grooves 96 and 97 in the shank 91 and counterbore 92 respectively. The groove 97 is relative shallow, so that it is possible to deform the O-ring 95 sufficiently for it to enter and escape from the socket 92 as the pressure pad 49 is coupled to and uncoupled from the piston stem 48.

OPERATION

In the operation of my improved brake actuator, normal service braking operations will be effected by air under pressure in service brake chamber 22 acting forwardly against diaphragm 18, while the unit B is maintained inactive by air pressure in chamber 46 holding the piston 50 in a retracted position with springs 51 compressed. In the event of failure of such air pressure, the springs 51 become operative to project the piston 50 forwardly, transmitting pressure through stem 48 and pressure pad 49, diaphragm 18 and head 24 to the brake actuator rod 23 thus effecting emergency application of the brakes. Similarly, the brakes can be actuated for parking by bleeding the air out of the system with a suitable manual control valve.

As the piston 50 moves forwardly, the shouldered head 57 of stem 48 will move up to the head 56 of tie rod 55, which is held against forward movement by the nut 65, fulcrumed against the head of boss 63. Before the piston 50 can engage the bulkhead 27 (or the boss 47) the shouldered end 57 of stem 48 will engage the head 56, thus preventing further forward movement of the piston and correspondingly preventing the load of springs 51 being applied to the cylinder coupling 53 through bulkhead 27 and cylinder 45. Thus it is always possible to readily uncouple the end cap 52 from the cylinder 45 by rotation of the cap relative to the cylinder to release the bayonet connections of the coupling 53.

Occasionally, after a vehicle has been parked and its air bled away to set parking brakes, it may become desirable to move the vehicle without restoring the air pressure, and it is of course necessary to release the brakes before the vehicle can be moved. This can be accomplished by manually advancing the nut 65 upon the threaded end 64 of tie rod 55, thus drawing the tie rod rearwardly, and since the rear end of piston stem 48 will be engaged by the head 56 of the tie rod, the piston will be retracted along with the tie rod. As the pressure pad 49 at the forward end of the piston stem is thus retracted, the diaphragm, the brake rod head 24 and the brake rod 23 will follow it under the yielding spring loading of the return spring 37, thus releasing the brakes. In order to rotate the nut 65, its head 69 may be grasped in an operator's hand, there being sufficient clearance between the head and the wall of the recess of boss 63 so that the fingers can be inserted into the recess sufficiently to adequately grasp the head 69.

After the brakes have thus been released and the vehicle is subsequently made ready for traveling under its own power, the nut 65 can be backed off with respect to threaded end 64 of tie rod 55, permitting the piston, stem and tie rod to be pushed forwardly by springs 51 until the tie rod is returned to its normal position shown in FIG. 1. The stop nut 74 on the rear end of the tie rod 55 will function to prevent excessive backing off of the nut 65 (to an extent such as would allow the piston 50 to contact the bulkhead 27). With the supply of air pressure restored, air under pressure can then be admitted to the chamber 46 of unit B, moving the piston 50 to its fully retracted position.

I claim:

A spring-powered emergency-parking brake actuator for use in connection with an air brake actuator having a diaphragm and a cover defining between them an air pressure chamber, said actuator comprising; a cylinder having its forward end closed by said cover; a cap detachably coupled to the rear end of said cylinder; a piston slidable in said cylinder and having a tubular stem slidably extended through the center of said cover, said stem having, at its forward end, means for transmitting brake-engaging pressure to said diaphragm, and at its rear end, a radially inwardly projecting abutment; compression spring means engaged between said piston and said rear end cap and operative to transmit brake-engaging pressure through said stem; means for admititng air under pressure to said cylinder between said cover and piston to retract the latter to brake releasing position; a tie-rod telescoped in said tubular stem, having at its forward end a head functioning as a stop for engagement by said abutment for limiting forward movement of the piston at a position short of engagement with said cover, having a threaded rear end portion projection through the center of said rear end cap, and having in one side thereof a chordal flat face extending from its rear end forwardly through said cap and through said rear end of the stem, the latter having an aperture receiving said tie-rod, said aperture having a flat face slidably engaged against said chordal face of the tie-rod and mating therewith to prevent rotation of the tie-rod within the stem while permitting relative axial movement; a stop nut threaded on said rear end of the tie-rod for adjustable positioning thereon, and a key secured in said stop nut and having a flat face mating with said chordal face of the tie-rod so as to lock said stop nut against rotation on the tie-rod and to thereby secure it in its selected position of adjustment; a manual retractor nut coupled to said threaded rear end portion rearwardly of said rear end cap and bearing against the latter for retracting said piston by a pull transmitted through said tie rod, said manual retractor nut including a tubular skirt defining an axial recess enclosing said stop nut, an annular knob on the rear end of said skirt, and a reduced shank at its forward end, said shank being internally threaded for coupling engagement with said tie-rod threaded portion and having at its rear end an annular shoulder defining the bottom of said axial recess and against which said stop nut is engageable; said stop nut limiting forward projection of said tie rod from said retractor nut by engagement with the latter.

References Cited by the Examiner

UNITED STATES PATENTS

| | | |
|---|---|---|
| 3,101,219 | 8/1963 | Herrera. |
| 3,117,496 | 1/1964 | Dobrikin _____ 92—128 X |
| 3,131,609 | 5/1964 | Dobrikin et al. _____ 92—128 X |
| 3,136,227 | 6/1964 | Williams _____ 92—128 X |

SAMUEL LEVINE, *Primary Examiner*.

RICHARD B. WILKINSON, *Examiner*.